US010982811B2

(12) United States Patent
Takizawa et al.

(10) Patent No.: US 10,982,811 B2
(45) Date of Patent: Apr. 20, 2021

(54) MATERIAL, STORAGE CONTAINER USING THE MATERIAL, VALVE ATTACHED TO THE STORAGE CONTAINER, METHOD OF STORING CLF AND METHOD OF USING CLF STORAGE CONTAINER

(71) Applicant: Kanto Denka Kogyo Co., Ltd., Tokyo (JP)

(72) Inventors: Hiroki Takizawa, Shibukawa (JP); Sho Kikuchi, Shibukawa (JP); Yukinobu Shibusawa, Shibukawa (JP)

(73) Assignee: KANTO DENKA KOGYO, CO., LTD., Tokyo (JP)

( * ) Notice: Subject to any disclaimer, the term of this patent is extended or adjusted under 35 U.S.C. 154(b) by 66 days.

(21) Appl. No.: 16/089,717

(22) PCT Filed: Mar. 16, 2017

(86) PCT No.: PCT/JP2017/010752
§ 371 (c)(1),
(2) Date: Sep. 28, 2018

(87) PCT Pub. No.: WO2017/175562
PCT Pub. Date: Oct. 12, 2017

(65) Prior Publication Data
US 2019/0113176 A1 Apr. 18, 2019

(30) Foreign Application Priority Data
Apr. 5, 2016 (JP) .............................. JP2016-075797

(51) Int. Cl.
F17C 1/10 (2006.01)
C23C 8/08 (2006.01)
(Continued)

(52) U.S. Cl.
CPC .................. F17C 1/10 (2013.01); C23C 8/06 (2013.01); C23C 8/08 (2013.01); C23C 8/10 (2013.01);
(Continued)

(58) Field of Classification Search
CPC ................ F17C 1/10; F17C 2203/0643; F17C 2203/0607; F17C 2260/053
(Continued)

(56) References Cited

U.S. PATENT DOCUMENTS 3,471,349 A * 10/1969 Bosworth ............... B05B 9/047
156/155
5,474,846 A * 12/1995 Haldenby .............. B05D 1/002
220/581
(Continued)

FOREIGN PATENT DOCUMENTS

EP 0352061 A2 1/1990
EP 1146135 A1 10/2001
(Continued)

OTHER PUBLICATIONS

Extended European Search Report dated Nov. 28, 2019 for the European Patent Application No. 17778941.9.
Partial Supplementary European Search Report dated Oct. 7, 2019 for the European Patent Application No. 17778941.9.

Primary Examiner — Shawn M Braden
(74) Attorney, Agent, or Firm — Volpe Koenig

(57) ABSTRACT

A material at least partly coated with a passive film of fluoride formed by contact with a gas containing ClF.

10 Claims, 2 Drawing Sheets

(51) Int. Cl.
*F16K 31/60* (2006.01)
*F16K 1/30* (2006.01)
*F16K 1/04* (2006.01)
*F16K 25/00* (2006.01)
*C23C 8/06* (2006.01)
*C23C 8/10* (2006.01)
*F16K 31/50* (2006.01)
*F16K 41/02* (2006.01)
*C23C 28/00* (2006.01)
*F17C 13/04* (2006.01)

(52) U.S. Cl.
CPC ............ *C23C 28/32* (2013.01); *C23C 28/345* (2013.01); *F16K 1/04* (2013.01); *F16K 1/302* (2013.01); *F16K 25/005* (2013.01); *F16K 31/50* (2013.01); *F16K 31/60* (2013.01); *F16K 41/02* (2013.01); *F17C 13/04* (2013.01); *F17C 2203/0607* (2013.01); *F17C 2203/0636* (2013.01); *F17C 2205/0394* (2013.01); *F17C 2221/01* (2013.01); *F17C 2270/0518* (2013.01)

(58) Field of Classification Search
USPC ........................................................ 220/586
See application file for complete search history.

(56) References Cited

U.S. PATENT DOCUMENTS

| | | | | |
|---|---|---|---|---|
| 5,858,881 | A | * | 1/1999 | Habuka ............... C23C 16/4404 438/758 |
| 2004/0149759 | A1 | * | 8/2004 | Moser ....................... F17C 1/16 220/581 |
| 2008/0245221 | A1 | * | 10/2008 | Kramer ................... B60T 13/57 91/376 R |
| 2009/0170332 | A1 | | 7/2009 | Komiyama et al. |
| 2010/0227052 | A1 | | 9/2010 | Carter et al. |

FOREIGN PATENT DOCUMENTS

| | | |
|---|---|---|
| EP | 1316755 A1 | 6/2003 |
| JP | 58-214092 A | 12/1983 |
| JP | 04-064226 A | 2/1992 |
| JP | 09-298329 A | 11/1997 |
| JP | 11-165375 A | 6/1999 |
| JP | 2003-017479 A | 1/2003 |
| JP | 2005-113182 A | 4/2005 |
| JP | 2006-138423 A | 6/2006 |
| JP | 2009-197274 A | 9/2009 |
| JP | 2010-147118 A | 7/2010 |
| JP | 2012-145214 A | 8/2012 |

* cited by examiner

MATERIAL, STORAGE CONTAINER USING THE MATERIAL, VALVE ATTACHED TO THE STORAGE CONTAINER, METHOD OF STORING CLF AND METHOD OF USING CLF STORAGE CONTAINER

TECHNICAL FIELD

The present invention relates to a material, a storage container using the material and a valve attached to the storage container, and further to a method of storing ClF and a method of using a ClF storage container.

BACKGROUND ART

In the fabrication of semiconductors, LCDs (liquid crystal displays), PDPs (plasma display panels) and the like, large amounts of fluorine-based gases are used in an etching process for etching a circuit pattern on a surface of a semiconductor substrate, and in a cleaning process for cleaning the inner side of semiconductor fabrication equipment and liquid crystal fabrication equipment.

Patent document 1 discloses a technology in which $ClF_3$ (chlorine trifluoride) is used as a fluorine-based gas for cleaning the semiconductor fabrication equipment.

PRIOR ART DOCUMENT

Patent Document

Patent Document 1: Japanese Unexamined Patent Application Publication No. 2010-147118

SUMMARY OF THE INVENTION

Problems to be Solved by the Invention

At high temperatures, fluorine-based gases containing chlorine fluoride are highly reactive, so that it is not easy to control reactions of fluorine-based gases in etching and cleaning. Further, use of a fluorine-based gas at high temperatures may lead to a problem that the fluorine-based gas reacts vigorously on contact with a component constituting the equipment to form a compound, so that the component is seriously damaged by corrosion.

To avoid this, it is conceivable to use ClF (chlorine monofluoride), which is a type of chlorine fluoride, in the above-mentioned etching and cleaning. Compared with other fluorine-based gases such as $ClF_3$ (boiling point: 11.75° C.) and $ClF_5$ (chlorine pentafluoride, boiling point: −14° C.), ClF has an extremely low boiling point (−100.1° C.), and therefore can be used in a relatively stable state at low to high temperatures.

ClF having an extremely low boiling point is, however, an extremely-reactive, noxious and corrosive gas. Thus, realization of a material which can curb fluorinating reaction and adsorption of ClF that contacts it, thereby curbing a reduction in ClF concentration and enabling safe handling of ClF at high purity, a storage container using that material, and a valve attached to that storage container, together with a method of storing ClF and a method of using a ClF storage container, is a task desired to be achieved.

The present invention has been made in view of the above problems. The object of the present invention is to provide a material which can curb fluorinating reaction and adsorption of ClF, thereby curbing a reduction in ClF concentration and enabling safe handling of ClF at high purity, a storage container using that material, and a valve attached to that storage container, together with a method of storing ClF and a method of using a ClF storage container.

Means for Solving the Problems

In order to achieve the above object, a material according to the present invention is characterized in that the material is at least partly coated with a passive film of fluoride formed by contact with a gas containing ClF.

Desirably, the passive film has a thickness of 5 nm to 50 nm.

Desirably, the gas further contains one or more substances chosen from a group consisting of $ClF_3$ and $F_2$.

Desirably, the material comprises a least one of substances: manganese steel, stainless steel, chrome molybdenum steel, aluminum alloy, nickel alloy, cobalt alloy, gold and resin, and is coated with the passive film.

A storage container according to the present invention is characterized in that the storage container is made of the above material and has an inner surface coated with the passive film.

Desirably, the storage container has a valve attached thereto, the valve having a flow passage for the gas to flow through, a valve seat through which the flow passage passes, and a valve member brought into contact with or away from the valve seat to close or open the flow passage, wherein the flow passage and at least the portions of the valve seat and valve member which are to be exposed to a gas are coated with the passive film.

Desirably, the valve member has a gas blocking surface pressed against the valve seat to close the flow passage, and the gas blocking surface has a gold plating layer with a thickness of 2 μm to 10 μm.

Desirably, the gold plating layer is sealed.

Desirably, the gold plating layer is oxidatively treated.

Desirably, the gold plating layer is coated with the passive film.

Desirably, the valve member is a disc shape.

Desirably, the valve member is a diaphragm.

A method of making a material according to the present invention is characterized by forming a passive film of fluoride of the material on a surface of the material by expositing the surface to a gas containing ClF.

Desirably, the ClF concentration of the gas is 1 weight % to 100 weight %.

A method of storing ClF according to the present invention is characterized in that ClF is introduced and stored in a storage container with an inner surface coated with a passive film of fluoride formed by introducing a gas containing ClF.

Desirably, the content of ClF introduced and stored in the storage container is 1 weight % to 100 weight %.

In a method of using a ClF storage container according to the present invention, the ClF storage container has an inner surface coated with a passive film of fluoride formed by introducing a gas containing ClF, and the method is characterized by comprising a step of filling the storage container with ClF, a step of using ClF by causing ClF to flow out of the storage container after the step of filling the storage container, and a purging step of depressurizing the storage container by vacuuming after the step of using ClF, and then filling the storage container with an inert gas.

Advantageous Effects of the Invention

The present invention can provide a material which can curb fluorinating reaction and adsorption of ClF stored in a storage container, thereby curbing a reduction in ClF concentration in the storage container and enabling safe handling of ClF at high purity, a storage container using that material, and a valve attached to that storage container, together with a method of storing ClF and a method of using a ClF storage container.

MODE OF CARRYING OUT THE INVENTION

With reference to the accompanying drawings, an embodiment of the present invention will be described.

Figure 1:
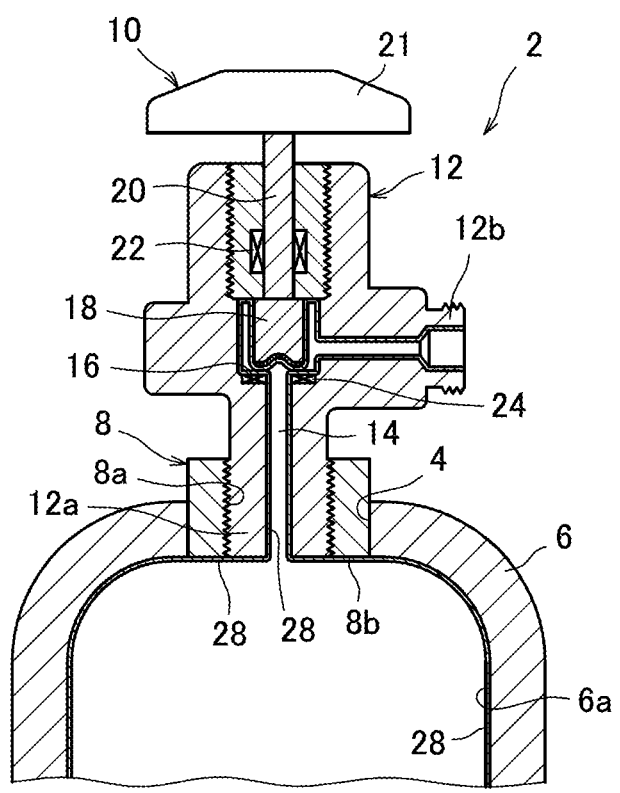
FIG. 1 is a fragmentary cross-sectional view showing a gas cylinder 2 formed using a material according to an embodiment of the present invention.

FIG. 1 is a fragmentary cross-sectional view showing a gas cylinder 2 formed using a material according to an embodiment of the present invention. The gas cylinder 2 is a pressure-resistant storage container used to store ClF, and comprises a container wall 6 with an opening 4 at the top, a cylindrical mouth ring 8 fitted in the opening 4, and a valve 10 fitted in the mouth ring 8.

The container wall 6 and the mouth ring 8 are made using at least one metallic material chosen from, for example manganese steel, stainless steel, chrome molybdenum steel, nickel alloy and aluminum alloy. The stainless steel is not limited to a specific type, although it needs to have corrosion resistance to ClF. The stainless steels usable include austenitic stainless steel, martensitic stainless steel, and ferritic stainless steel.

The valve 10 comprises a valve body referred to simply as body 12, a gas flow passage 14 formed in the body 12, a valve seat 17 through which the flow passage 14 passes, a disc-shaped valve member 18, a valve stem 20 connected to the valve member 18 at the bottom, and a manually-operated handle 21 to which the valve stem 20 is connected at the top. A seal is created around the valve stem 20 by a gland gasket 22 fitted within the body 12, and a disc gasket 24 is mounted on the valve seat 16. By rotating the handle 21, the valve stem 20 rotates, so that the valve member 18 moves away from or comes into contact with the valve seat 16 with the disc gasket 24 interposed between them to open or close the flow passage 14. The valve 10 may be an all-metal valve, in which case, the disc gasket 24 is not present, so that the valve member 18 moves away from or comes into direct contact with the valve seat 16 to open or close the flow passage 14.

The body 12 is made using at least one metallic material chosen from, for example stainless steel, nickel alloy and cobalt alloy, and includes a lower connecting portion 12a screwed into the mouth ring 8 with a threaded inner surface 8a, and a lateral connecting portion 12 onto which a closure cap, not shown, is screwed. The gland gasket 22 and the disc gasket is made of a resin material, such as PCTFE (polychlorotrifluoroethylene) or PTFE (polytetrafluoroethylene), and annular in shape.

Figure 2:
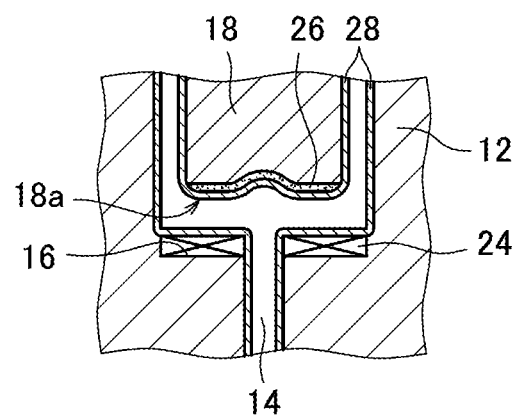
FIG. 2 is an enlarged view showing a valve of FIG. 1 with a valve member away from a valve seat.

FIG. 2 is an enlarged view showing the valve 10 of FIG. 1 with the valve member 18 away from the valve seat 16. The valve member 18 has a sealing surface 18a at the bottom, which, when the valve 10 is closed, closes the flow passage 14, thereby blocking a gas. The sealing surface 18a has a gold plating layer formed with a thickness of 2 μm to 10 μm. The gold plating layer 26 is sealed to close pin holes therein with a sealer. The gold plating layer 28 may be oxidatively treated to be coated with an oxide film. The sealing and the oxidative treatment increase the sealing surface 18a's corrosion resistance to ClF.

In the present embodiment, the valve member 18 is a disc shape as mentioned above. Accordingly, the sealing surface 18a of the valve member 18 is pressed against the disc gasket 24 on the valve seat 16 in a manner making a plane contact. Accordingly, in the valve 10, the pressure exerted on the sealing surface 18a when the sealing surface 18a of the valve member 18 is pressed against the disc gasket 24 on the valve seat 16 is reduced as compared with, for example a needle valve (not shown) in which a needle-shaped valve member is pressed against a valve seat in a manner making a line contact. This effectively curbs separation of the gold plating layer 26 from the sealing surface 18a. Further, this effectively prevents the sealing surface 18a from being physically damaged when the valve is opened or closed, and thus, curbs deterioration of the sealing surface 18a, which leads to the valve 10's increased corrosion resistance to ClF.

As shown in FIGS. 1 and 2, in the present embodiment, a passive film 28 of fluoride is formed in all the regions of the gas cylinder 2 (inclusive of the mouth ring 8 and the valve 10) that are exposed to gas, hereinafter referred to as "gas-contacting regions", which include the inner surface 6a of the container wall 6 of the gas cylinder 2, the inner end face 8b of the mouth ring 8 facing to the inside of the gas cylinder 2, the flow passage 14 in the valve 10, the valve member 18 including the gold plating layer 26 formed on the sealing surface 18a, and the valve seat 16 including the disc gasket 24 mounted on.

The passive film 28 is formed by a so-called passivation process which exposes the gas-contacting regions to a gas containing ClF (hereinafter referred to also as a use gas), and has a thickness of 5 nm or greater, desirably approximately 5 nm to 50 nm. Specifically, when ClF which is a use gas contacts the gas-contacting regions, 5 nm is a minimum thickness that can prevent corrosion and damage of the material by fluorinating reaction, and thus, the passive film 28 is formed with a thickness of 5 nm or greater. Considering the cost of forming the passive film 28 (processing time, the amount of ClF used, etc. which will be described later), the upper limit of the thickness of the passive film 28 is desirably approximately 50 nm.

In the passivation process, with the valve 10 open and with the lateral connecting portion 12b of the body 12 of the valve 10 connected to a use gas supply source by a pipe, not shown, the passivating gas is introduced into the gas cylinder 2. The passivation process is performed using the use gas with the composition given below under the processing conditions given below.

Use gas: Gas containing only ClF or gas containing ClF and one or more substances chosen from a group consisting of $ClF_3$ and $F_2$ (the gas may contain $N_2$ (nitrogen) or another inert gas as a base gas)

ClF concentration of use gas: Approximately 1 weight % to 100 weight %

Processing time (duration of exposure to use gas): Six hours or longer

Processing temperature: Approximately 10° C. to 100° C.

Processing pressure: Approximately 0 MPaG to 0.1 MPaG

Higher ClF concentration enables faster formation of the passive film 28, and that with higher film strength. Longer processing time leads to higher film strength of the passive film 28. The gas exposure time is measured from the moment that the use gas contacts the gas-contacting regions.

Higher processing temperature enables faster formation of the passive film 28, and that with higher film strength. However, excessively high processing temperature increases the possibility of metallic corrosion in the gas-contacting regions. Thus, the range of processing temperature specified above is desirable. ClF is highly adsorbable onto metal and therefore can easily form the passive film 28 even at low temperatures. Higher processing pressure enables faster formation of the passive film 28, and that with higher film strength. However, excessively high processing pressure makes the handling of the use gas difficult and dangerous. Thus, the range of processing pressure specified above is desirable. After the passivation process is finished, the use gas is discharged from the gas cylinder 2 appropriately, and then, cyclic purge which repeats a purge cycle consisting of depressurization with a vacuum pump and filling with an inert gas many times is performed, so that the gas cylinder 2 is ready for actual use.

Figure 3:
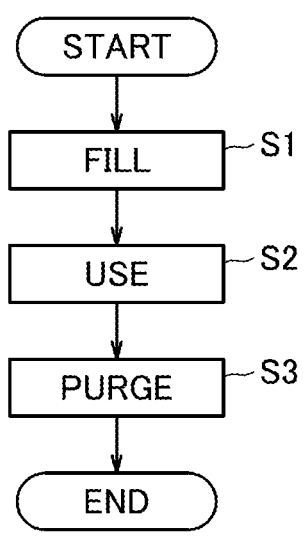
FIG. 3 is a flowchart showing how to use the gas cylinder of FIG. 1 in chronological order.

FIG. 3 is a flowchart showing how to use the gas cylinder 2 that has experienced the above-described passivation process, in chronological order.

<Filling: S1>

First, at step S1, a gas containing ClF (hereinafter referred to simply as ClF or to-be-stored gas) is introduced to be stored in the gas cylinder 2 with the passive film 28 formed and ready for use. Specifically with the valve 10 open and with the lateral connecting portion 12b of the valve 10 connected to a to-be-stored gas supply source, not shown, the to-be-stored gas is introduced into the gas cylinder 2. After the gas cylinder is filled with the to-be-stored gas, the valve 10 is closed, so that the to-be-stored gas is stored in the sealed gas cylinder 2.

<Use: S2)

Next, at step S2, the gas cylinder 2 filled with the gas is transported to an intended place, where the stored gas is used. Specifically, with the lateral connecting portion 12b of the valve 10 connected to a gas supply destination, not shown, the valve 10 is opened to allow the gas to flow out of the gas cylinder 2 to the gas supply destination. After the stored gas is used, the valve 10 is closed and the gas cylinder 2 is returned from the gas supply destination.

<Purging: S3)

Next, at step S3, a purging device, not shown, is connected to the lateral connecting portion 12b of the valve 10 of the gas cylinder 2 returned. The gas remaining in a minute amount in the gas cylinder 2 is removed by depressurizing the gas cylinder 2 by vacuuming with the purging device, and then, the gas cylinder 2 is filled with an inert gas.

The inert gas is nitrogen or a noble gas having a stable nuclide, such as argon, helium, neon, xenon or krypton. The inert gas is poorly reactive and used in chemical synthesis, chemical analysis and storage of substances with high reactivity. Because of its low reactivity, the inert gas is often used to avoid unwanted chemical reactions.

Specifically, the purging device includes a vacuum pump, not shown, and is configured to be able to perform cyclic purging which repeats a purge cycle consisting of depressurization to approximately −0.1 MPaG with the vacuum pump and introduction of the inert gas up to normal pressure, many times. ClF is easily adsorbed onto and penetrating into metal, and it is not easy to blow away ClF adsorbed. Thus, in order to prevent deterioration of the gas cylinder 2, after use of the gas cylinder 2, the purge cycle consisting of filling with the inert gas and depressurization with the vacuum pump is repeated ten times or more. The number of times that the purge cycle is repeated is determined depending on the amount of ClF adsorbed on the gas cylinder 2 to ensure the removal of ClF adsorbed on the gas cylinder 2 and enable long-term use of the gas cylinder 2 without corrosion.

After exposed to ClF, the gas-contacting regions of the gas cylinder 2 are likely to corrode and deteriorate on contact with water in the air. Thus, the valve 10 is closed, and the pipe attached to the lateral connecting portion 12b of the body 12 of the valve 10 is detached and put in a container such as desiccator, not shown, prepared for it, subjected to purging with an inert gas such as nitrogen, and held therein. To the lateral connecting portion 12b is attached the above-mentioned closure cap. Thus, the pipe and the lateral connecting portion 12b are protected against corrosion by exposure to the air. Although there is no specific rule, greater amount of purging with the inner gas and longer purging time are desirable for the pipe. Here, the amount of purging is determined by the amount of the inert gas used in one purge cycle and the number of repetitions of the purge cycle.

Next, with reference to tables 1 to 4, experiments 1 to 4 performed on examples 1 to 7 and comparative examples 1 to 5 concerning the resistance to ClF will be described. The present invention is not limited by the results of experiments on these examples.

<Experiment 1>

A gold plating layer was formed on test pieces prepared with the valve member 18 of the valve 10 in mind, and, as shown in table 1, the effects of the difference in gold plating layer thickness and the sealing and oxidative treatment for the gold plating layer upon the resistance to ClF were assessed by using, as indices, the change in weight of the test piece, the rate of surface corrosion thereof and the separation of the gold plating layer. The rate of surface corrosion is calculated based on the change in weight of the test piece, the surface area thereof and the testing time. The rate of surface corrosion is a negative value when the corrosion of the gold plating layer results in a reduction in weight of the test piece. Here, the corrosion includes a phenomenon that fluoride or chloride formed on or penetrating into the gold plating layer causes the gold plating layer to tarnish or separate.

TABLE 1

|  | Gold plating layer thickness (µm) | Sealing | Oxidative treatment | Change in weight (%) | Rate of surface corrosion (mg/cm$^2$ · h) | Gold plating layer separation |
|---|---|---|---|---|---|---|
| Example 1 | 7.3 to 8.4 | Not applied | Not applied | 0.009 | 0.0014 | Not found |
| Example 2 | 2.5 to 2.6 | Applied | Not applied | 0.002 | 0.0003 | Not found |

TABLE 1-continued

| | Gold plating layer thickness (μm) | Sealing | Oxidative treatment | Change in weight (%) | Rate of surface corrosion (mg/cm² · h) | Gold plating layer separation |
|---|---|---|---|---|---|---|
| Example 3 | 2.5 to 2.6 | Not applied | Applied | 0.0014 | 0.0021 | Not found |
| Example 4 | 2.5 to 2.6 | Not applied | Not applied | −0.005 | −0.0008 | Found |
| Comparative example 1 | 0.3 | Not applied | Not applied | −0.009 | −0.0014 | Found |

EXAMPLE 1

A test piece prepared according to the following conditions:
 Thickness of gold plating layer: 7.3 to 8.4 μm
 Sealing for gold plating layer: Not applied
 Oxidative treatment for gold plating layer: Not applied
  was subjected to a ClF gas exposure test, and the following results were obtained.
 Change in weight of test piece: Increased by 0.009%
 Rate of surface corrosion of test piece: 0.0014 mg/cm²·h
Finally,
 Separation of gold plating layer from test piece: Not found
It was therefore determined that example 1 was acceptable.

EXAMPLE 2

A test piece prepared according to the following conditions:
 Thickness of gold plating layer: 2.5 to 2.6 μm
 Sealing for gold plating layer: Applied
 Oxidative treatment for gold plating layer: Not applied
  was subjected to the ClF gas exposure test, and the following results were obtained.
 Change in weight of test piece: Increased by 0.002%
 Rate of surface corrosion of test piece: 0.0003 mg/cm²·h
Although example 2 had a gold plating layer approximately one third as thick as that of example 1, example 2 exhibited a change in weight and a rate of surface corrosion reduced to approximately one fourth of those of example 1, due to the sealing applied to the gold plating layer. The corrosion of the gold plating layer by ClF was thus greatly reduced. Finally,
 Separation of gold plating layer from test piece: Not found
It was therefore determined that example 2 was acceptable.

EXAMPLE 3

A test piece prepared according to the following conditions:
 Thickness of gold plating layer: 2.5 to 2.6 μm
 Sealing for gold plating layer: Not applied
 Oxidative treatment for gold plating layer: Applied was subjected to the ClF gas exposure test, and the following results were obtained.
 Change in weight of test piece: Increased by 0.014%
 Rate of surface corrosion of test piece: 0.0021 mg/cm²·h
Although example 3 had a gold plating layer approximately one third as thick as that of example 1, example 3 exhibited a change in weight and a rate of surface corrosion increased to approximately one-and-a-half times those of example 1, due to the oxidative treatment applied to the gold plating layer. This is because the oxide film was formed on the gold plating layer. The oxide film however curbed the corrosion of the gold plating layer by ClF. Thus, finally,
 Separation of gold plating layer from test piece: Not found
It was therefore determined that example 3 was acceptable.

EXAMPLE 4

A test piece prepared according to the following conditions:
 Thickness of gold plating layer: 2.5 to 2.6 μm
 Sealing for gold plating layer: Not applied
 Oxidative treatment for gold plating layer: Not applied
  was subjected to the ClF gas exposure test, and the following results were obtained.
 Change in weight of test piece: Reduced by 0.005%
 Rate of surface corrosion of test piece: −0.0008 mg/cm²·h
 The test piece was reduced in weight, so that the rate of surface corrosion was a negative value, which indicates that the gold plating layer experienced deep corrosion. Finally,
 Separation of gold plating layer from test piece: Found
However, example 4 exhibited only slight separation of the gold plating layer, and a leak test, which will be described later in connection with experiment 2, showed that a leak did not occur in example 4. It was therefore determined that example 4 was acceptable.

COMPARATIVE EXAMPLE 1

A test piece prepared according to the following conditions:
 Thickness of gold plating layer: 0.3 μm
 Sealing for gold plating layer: Not applied
 Oxidation treatment for gold plating layer: Not applied
  was subjected to the ClF gas exposure test, and the following results were obtained.
 Change in weight of test piece: Reduced by 0.009%
 Rate of surface corrosion of test piece: −0.0014 mg/cm²·h
 The test piece was reduced in weight, so that the rate of surface corrosion was a negative value, which indicates that the gold plating layer experienced deep corrosion. Finally
 Separation of gold plating layer from test piece: Found
It was therefore determined that comparative example 1 was rejectable.

As understood from the above, experiment 1 showed that a test piece with a thicker gold plating layer can prevent separation of the gold plating layer, and thus, has a higher resistance to ClF. As example 4 showed, slight separation of the gold plating layer does not necessarily lead to a leak. It was proved that the formation of a gold plating layer with a thickness of at least approximately 2 μm to 10 μm is desirable.

Experiment 1 further showed that a test piece with a sealed or oxidatively-treated gold plating layer can reduce surface corrosion of the test piece and prevent separation of the gold plating layer, even if the gold plating layer is thin. It was observed that the test piece tends to increase in weight as the corrosion becomes deeper. The test piece with the gold plating layer separated exhibited a reduced weight because of the separation of the gold plating layer.

It was confirmed that forming a gold plating layer 26 with a thickness of at least approximately 2 μm to 10 μm on the sealing surface 18a of the valve member 18 of the valve 10 and applying sealing or oxidative treatment to the gold plating layer 26 increases the valve 10's resistance to ClF, which enables safe storage and handling of ClF in the gas cylinder 2. Incidentally, both the sealing and the oxidative treatment may be applied to the gold plating layer 26, although such example is not given above. Needless to say, this can prevent separation of the gold plating layer 26.

<Experiment 2>

With the gas cylinder 2 filled with ClF and with an experimental valve, not shown, closed, an experimental process of repeating the opening and closing of the valve 10 or a needle valve 2000 times was performed three times, as shown in table 2. Then, the experimental valve was detached from the gas cylinder 2, ClF was discharged from the gas cylinder 2, and then the gas cylinder 2 was subjected to cyclic purge. After that, the gas cylinder 2 was filled with He (helium), and then a He leak detector was connected to the gas cylinder 2 to measure a leak rate.

TABLE 2

|  | Example 5 Valve member: Disc-shaped | | Comparative example 2 Valve member: Needle-shaped | |
| --- | --- | --- | --- | --- |
|  | Leak rate (Pa · m³/sec) | Leak | Leak rate (Pa · m³/sec) | Leak |
| First time | $3.3 \times 10^{-9}$ | Not occurred | $1.3 \times 10^{-8}$ | Not occurred |
| Second time | $2.7 \times 10^{-9}$ | Not occurred | $1.2 \times 10^{-4}$ | Occurred |
| Third time | $3.1 \times 10^{-9}$ | Not occurred | $1.0 \times 10^{-3}$ or higher | Occurred |

EXAMPLE 5

Valve member: Disc-shaped
The results:
First time leak rate: $3.3 \times 10^{-9}$ Pa·m³/sec
Second time leak rate: $2.7 \times 10^{-9}$ Pa·m³/sec
Third time leak rate: $3.1 \times 10^{-9}$ Pa·m³/sec were obtained.
    Thus, in each measurement, the determination was:
Leak: Not occurred
It was therefore determined that example 5 was acceptable.

COMPARATIVE EXAMPLE 2

Valve member: Needle-shaped
The results:
First time leak rate: $1.3 \times 10^{-8}$ Pa·m³/sec
Second time leak rate: $1.2 \times 10^{-4}$ Pa·m³/sec
Third time leak rate: $1.0 \times 10^{-3}$ Pa·m³/sec or higher were obtained. Thus, in the first-time measurement, the determination was:
Leak: Not occurred and in the second-time and third-time measurement, the determination was:
    Leak: Occurred
It was therefore finally determined that comparative example 2 was rejectable.

As understood from the above, experiment 2 showed that the gas cylinder 2 with a needle valve having a needle-shaped valve element 18 was likely to exhibit a leak after the 2000-times opening and closing test. By contrast, the gas cylinder 2 with a valve 10 having a disc-shaped valve member 18 did not exhibit a leak after the 2000-times opening and closing test. It was therefore confirmed that use of a valve 10 having a disc-shaped valve member 18 as shown in FIG. 1 curbs separation of the gold plating layer 26 and thus prevents physical damage of the sealing surface 18a, which enables safe storage and handling of ClF in the gas cylinder 2.

<Experiment 3>

As shown in table 3, test pieces were subjected to a passivation process with ClF and a passivation process with $F_2$, respectively, under the conditions given below to see whether there was a difference in thickness between passive films formed.

ClF concentration of the gas used: 1 weight % to 100 weight %
Processing time (duration of exposure to the gas used): Six hours or longer
Processing temperature: Approximately 10° C. to 100° C.
Processing pressure: Approximately 0 MPaG to 0.1 MPaG

TABLE 3

|  | Example 6 ClF passivation process | Comparative example 3 $F_2$ passivation process |
| --- | --- | --- |
| Thickness (nm) | 4 | 8 |

EXAMPLE 6

The thickness of the passive film formed on the test piece by ClF was 4 nm.

COMPARATIVE EXAMPLE 3

The thickness of the passive film formed on the test piece by $F_2$ was 8 nm. Under the same conditions, the passive film twice as thick was formed.

As experiment 3 showed, the passivation process with ClF can form a thinner passive film, and thus, it can form, for example on the valve member 18, valve seat 16, disc gasket 24, etc. of the valve 10, a thin passive film 28 which is hardly affected by friction and affects the closing capacity of the valve 10 as little as possible. It was thus confirmed that the passivation process with ClF is effective in storage and handling of ClF.

The thickness of the passive film 28 formed by ClF varies depending on the type of material, such as metal, exposed to the introduced gas, the surface roughness of the material, the conditions under which the introduced gas is used, etc. In the above-described experiment, the thickness of the passive film formed by ClF was 4 nm, which is only the result of experiment 3 under the conditions given above. It has been proved that under different conditions, the passive film 28 with a thickness of at least 5 nm to 50 nm is desirable.

<Experiment 4>

The state after use of the gas cylinder 2 was created by filling the gas cylinder 2 with ClF and then discharging ClF from the gas cylinder 2. With the valve 10 closed, an experimental valve, not shown, was connected to the lateral connecting portion 12b of the body 12 of the valve 10, and then, a purging device, not shown, was connected thereto. Then, with the experimental valve opened, the gas cylinder 2 was depressurized to and kept at −0.1 MPaG (for 60 seconds) by vacuuming with the purging device, thereby removing ClF remaining in the gas cylinder 2 in a minute amount, and then, the gas cylinder 2 was filled with nitrogen.

The purging device performed cyclic purge, which repeats a purge cycle consisting of depressurization with a vacuum pump and filling with an inert gas. Then, the purging device was removed and a gas detector, not shown, was connected instead. Then, with the experimental valve opened, the amount of ClF remaining in the gas cylinder 2 was measured for differing numbers of repetitions of the purge cycle, as indicated in table 4, to determine whether ClF was detected.

TABLE 4

| | Number of repetitions of purge cycle | Duration of depressurization (sec) | ClF detection |
|---|---|---|---|
| Example 7 | 100 | 60 | Not detected |
| Comparative example 4 | 50 | 60 | Detected (2 ppm or more) |
| Comparative example 5 | 70 | 60 | Detected (2 ppm or more) |

EXAMPLE 7

In the instance where
Number of repetitions of purge cycle: 100
Duration of depressurization: 60 seconds the result was:
ClF detection: Not detected
It was therefore determined that example 7 was acceptable.

COMPARATIVE EXAMPLE 4

In the instance where
Number of repetitions of purge cycle: 50
Duration of depressurization: 60 seconds the result was:
ClF detection: Detected (2 ppm or more)
It was therefore determined that comparative example 4 was rejectable.

COMPARATIVE EXAMPLE 5

In the instance where
Number of repetitions of purge cycle: 70
Duration of depressurization: 60 seconds the result was:
ClF detection: Detected (2 ppm or more)
It was therefore determined that comparative example 5 was rejectable.

The number of repetitions of the purge cycle which achieves the state with no ClF detected varies depending on the type of material, such as metal, exposed to the introduced gas, the surface roughness of the material, the conditions under which the introduced gas is used, etc. In the above-described experiment, in the instance where the purge cycle was repeated 50 times and in the instance where it was repeated 70 times, ClF was detected, and thus, it cannot be determined that these instances are acceptable. These are however only the results of experiment 4 under the conditions given above. It has been proved that under some conditions, the state with no ClF detected can be achieved by repeating the purge cycle at least 10 times.

Experiment 4 thus confirmed that ClF can be completely blown away from the gas cylinder 2 by an appropriately-determined number (at least 10) of repetitions of the purge cycle consisting of depressurization (keeping −0.1 MPaG for 60 sec) and introduction of nitrogen up to normal pressure or higher. Further, it has been proved that in order to completely blow away ClF for safe handling, cyclic purge sufficient for the amount of ClF adsorbed not only on the gas cylinder 2 but also on the valve 10 is required.

As described above, in the present embodiment, the passive film formed in advance in the gas-contacting regions of the gas cylinder 2 including the mouth ring 2 and the valve 10 curbs fluorinating reaction and adsorption of ClF stored in the gas cylinder 2, and thus, curbs a reduction in concentration of ClF stored. The present invention can thus provide a gas cylinder enabling safe handling of ClF at high purity, and a valve 10 attached to the gas cylinder 2, together with a method of storing ClF in the gas cylinder 2 and a method of using the gas cylinder 2 holding ClF.

In the above, an embodiment of the present invention has been described. The present invention is however not limited to the described embodiment, to which various alterations can be made without deviating from the essentials of the present invention.

For example, the formation of the passive film 28 is applicable not only to the gas cylinder 2; by forming a passive film 28 at least partly on the material forming a variety of components or devices, at least fluorinating reaction caused by ClF on contact with the material can be curbed.

In place of the valve 10 having a disc-shaped valve member 18, a diaphragm valve, not shown, may be used. Generally, the dead space in the diaphragm valve is small, which allows inert gas replacement in gas-contacting regions of the valve, and thus, cyclic purge to be performed with increased effectiveness.

EXPLANATION OF REFERENCE SIGNS

2 Gas cylinder
6a Inner surface
10 Valve
14 Flow passage
16 Valve seat
18 Valve member
18a Sealing surface
26 Gold plating layer
28 Passive film

The invention claimed is:
1. A storage container
characterized in that the storage container is made of a material, the material is at least partly coated with a passive film of fluoride formed by contact with a gas containing ClF;
characterized in that the storage container has an inner surface coated with the passive film; and
characterized in that the storage container has a valve attached thereto, the valve having
a flow passage for the gas to flow through,
a valve seat through which the flow passage passes, and a valve member brought into contact with or away from the valve seat to close or open the flow passage, wherein the flow passage and the portions of the valve seat and valve member which are to be exposed to a gas are coated with the passive film.

2. The storage container according to claim 1, characterized in that the valve member has a sealing surface pressed against the valve seat to close the flow passage, and the sealing surface has a gold plating layer with a thickness of 2 μm to 10 μm.

3. The storage container according to claim 2, characterized in that the gold plating layer is sealed.

4. The storage container according to claim 2, characterized in that the gold plating layer is oxidatively treated.

5. The storage container according to claim 2, characterized in that the gold plating layer is coated with the passive film.

6. The storage container according to claim 1, characterized in that the valve member is a disc shape.

7. The storage container according to claim 2, characterized in that the valve member is a diaphragm.

8. The material according to claim 1, characterized in that the passive film has a thickness of 5 nm to 50 nm.

9. The material according to claim 1, characterized in that the gas further contains one or more substances chosen from a group consisting of $ClF_3$ and $F_2$.

10. The material according to claim 1, characterized in that the material comprises at least one of substances: manganese steel, stainless steel, chrome molybdenum steel, nickel alloy, aluminum alloy, cobalt alloy, gold and resin, and is coated with the passive film.

* * * * *